United States Patent [19]

Elliott et al.

[11] 4,046,802

[45] Sept. 6, 1977

[54] PROCESS FOR MAKING A HIGH MOLECULAR WEIGHT ALKYLPHENOXY SUBSTITUTED ALIPHATIC CARBOXYLIC ESTER

[75] Inventors: John Scotchford Elliott, Beaconsfield; Bryan Terence Davis; Richard Martin Howlett, both of Wokingham, all of England

[73] Assignee: Edwin Cooper and Company Limited, Bracknell, England

[21] Appl. No.: 680,210

[22] Filed: Apr. 26, 1976

Related U.S. Application Data

[63] Continuation-in-part of Ser. No. 446,461, Feb. 27, 1974, abandoned.

[30] Foreign Application Priority Data

Feb. 27, 1973 United Kingdom ............... 09542/73

[51] Int. Cl.$^2$ ........................... C09F 5/08; C09F 7/10; C07C 69/76
[52] U.S. Cl. ............................... 560/61 G; 260/410.5
[58] Field of Search ........................ 260/473 G, 410.5

[56] References Cited

U.S. PATENT DOCUMENTS

| | | | |
|---|---|---|---|
| 2,252,666 | 8/1941 | Reiff et al. | 260/520 R |
| 2,563,872 | 8/1951 | Rust et al. | 260/473 G |
| 3,360,464 | 12/1967 | Otto | 260/473 G |

*Primary Examiner*—Winston A. Douglas
*Assistant Examiner*—John F. Niebling
*Attorney, Agent, or Firm*—Donald L. Johnson; Robert A. Linn; Joseph D. Odenweller

[57] ABSTRACT

Alkylphenoxy alkanoic esters are made in high yield by reaction of a $C_{50-200}$ alkylphenol with a halo-substituted alkanoic ester in the presence of a base. The reaction product contains little unreacted alkylphenol and is converted without separation to a reaction mixture containing mainly alkylphenoxy alkanoic amide by reaction with amines. The amide reaction mixture is an effective ashless dispersant for lubricating oil.

15 Claims, No Drawings

PROCESS FOR MAKING A HIGH MOLECULAR WEIGHT ALKYLPHENOXY SUBSTITUTED ALIPHATIC CARBOXYLIC ESTER

PRIOR APPLICATION

This application is a continuation-in-part of application Ser. No. 446,461, filed Feb. 27, 1974 now abandoned.

BACKGROUND

This invention relates to lubricant additives, more particularly to certain novel compounds useful in the preparation of lubricant additives, or which in certain cases may be useful as lubricant additives.

Amongst the numerous types of additives used in blending lubricants, particularly but not exclusively automotive lubricants, are various surface active materials. For example, dispersants, particularly ashless dispersants, are incorporated in lubricants in order to disperse carbon particles and other insoluble materials such as decomposition products and fuel oxidation products in the oil medium which is the major constituent of the lubricant. The insoluble materials are thus suspended in the oil medium and prevented from forming deposits which can deleteriously affect engine operation. Another role in which surface active materials are used is in overbasing processes in which a suspension or dispersion of a metal compound, particularly an alkaline earth metal compound such as calcium, barium or magnesium oxide or hydroxide, is treated with an acidic gas such as carbon dioxide. During such processes a surface active material, commonly termed a soap, is used to form a stable suspension of the metal, for example, in the form of the carbonate, in the resulting additives. The additives are basic, often very highly basic with total base numbers of up to 400 to 500 KOH/g and even higher, and are used to neutralize acidic combustion products formed in the engine.

Although various additives have been developed for the foregoing purposes, nevertheless lubricant manufacturers continually seek additives of improved performance, both for present needs and also for future needs as advances in engine design lead to higher power outputs creating a more severe operating environment which requires superior lubricant additives.

We have now found certain novel compounds which may be used as intermediates in the production of lubricant additives.

SUMMARY

Accordingly, the present invention provides a compound which is a condensation product of an alkyl-substituted phenol, preferably a p-alkyl-substituted phenol, in which the alkyl substituent contains at least 8 carbon atoms, more preferably at least 30 carbon atoms and most preferably at least 50 carbon atoms, and at least one halogen-substituted aliphatic carboxylic ester. The carboxylic ester may be substituted by two or more halogen atoms, but preferably has a single halogen atom substituent. For the purpose of the condensation reaction by which the novel compounds of the present invention may be prepared, bromine is more suitable than chlorine as the halogen substituent as the former is more reactive. However, on economic grounds we prefer to use a chloro-substituted carboxylic ester.

In another aspect of the present invention there is provided a compound having the general formula:

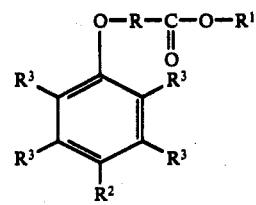
(A)

wherein:
a. each $R^3$ is the same or different and is a hydrogen atom; an alkyl group containing from 1 to 16, preferably 1 to 4, carbon atoms; a halogen atom, preferably a chlorine atom; or one group $R^3$ in the ortho position relative to the oxygen atom attached to the aromatic nucleus is a group of the formula:

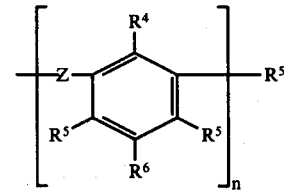

in which
i. $n$ is an integer, preferably from 1 to 6;
ii. each Z is the same or different and is a sulfur chain of formula $+S+_m$ wherein $m$ is from 1 to 4, preferably 1 or 2; a methylene group; or a residue of a carbonyl-substituted carboxylic acid or derivative thereof which residue has the formula:

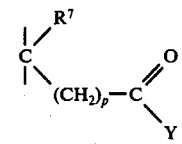

in which each $R^7$ is the same or different and is a hydrogen atom or a methyl group or the group

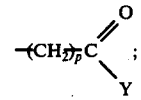

each $p$ is the same or different and is an integer, preferably zero, 1 or 2, or most preferably zero; each Y is the same or different and is a hydroxyl group, an alkoxy group, an amino group or the group $-O-M^+$ in which $M^+$ is an ammonium, amino or monovalent metal cation;
iii. each $R^4$ is the same or different and is a hydrogen atom; an alkyl group containing from 1 to 16, preferably 1 to 4, carbon atoms; a halogen atom, preferably a chlorine atom; a hydroxyl group; a group of formula

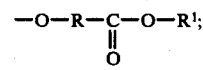

or $R^4$ together with a residue of a carbonyl-substituted carboxylic acid constituting a group Z forms a lactone ring;

iv. each $R^5$ is the same or different and is a hydrogen atom; an alkyl group containing from 1 to 16, preferably 1 to 4, carbon atoms; a halogen atom, preferably a chlorine atom; a hydroxyl group; or a group of formula

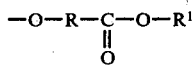

provided that one of, but not more than one of, groups $R^4$ and $R^5$ is a hydroxyl group or a group of formula

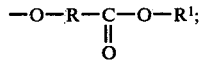

and v. each $R^6$ is the same or different and is a hydrogen atom; an alkyl group containing from 1 to 7, preferably 1 to 4, carbon atoms; a halogen atom, preferably a chlorine atom; or is as $R^2$;

vi. provided that one group $R^3$ in the ortho position relative to the oxygen atom attached to the aromatic nucleus is a hydrogen or halogen atom or a methyl or ethyl group;

b. each R is the same or different and is a straight or branched chain alkylene group containing from 1 to 20, preferably 1 to 12, more preferably 1 to 4, carbon atoms;

c. each $R^1$ is the same or different and is the residue of a hydroxy compound, preferably the residue of an alkanol containing from 1 to 6 carbon atoms, and more preferably from 1 to 4 carbon atoms; and d. each $R^2$ is the same or different and is an alkyl group containing at least 8 carbon atoms.

The groups $R^2$ in the foregoing compounds, or in the case of the above-identified condensation products the alkyl groups derived from the alkyl-substituted phenols, may be comparatively short-chain alkyl groups such as octyl, nonyl, or dodecyl groups. Alternatively, these alkyl groups may be comparatively long-chain groups containing at least 30, preferably at least 50, carbon atoms. However, to provide the desired degree of oil-solubility it is necessary that the number of carbon atoms in each of these alkyl groups is at least 8. To provide the desired dispersant properties the alkyl groups preferably contain at least 18 carbon atoms and for this reason the comparatively long-chain alkyl groups are preferred. In this embodiment the alkyl groups may contain, for example, from 50 to 200 carbon atoms. In such cases the alkyl groups may be derived from long-chain olefins such as a poly-(alphaolefin), which may have molecular weights in the range of 700 to 3,000, more preferably 900 to 1,500, and particularly about 1,000. Examples of suitable poly-(alphaolefins) are polyisobutylenes (PIB) and polypropylenes.

In the case of the above-defiend condensation products the alkyl-substituted phenol starting material may bear one or more additional substituents on the aromatic ring and these correspond to the groups $R^3$ in the compounds of the foregoing general formula. When no substituent, other than the alkyl substituent corresponding to $R^2$, is present this corresponds to all groups $R^3$ being hydrogen atoms and such compounds are highly preferred.

The present invention also includes processes for preparing the novel substances. Accordingly, this invention includes a process wherein at least one alkyl-substituted phenol, in which the alkyl substituent contains at least 8 carbon atoms, is condensed with at least one halogen-substituted aliphatic carboxylic ester. In its preferred aspect the process comprises the condensation of at least one p-alkyl-substituted phenol of the formula:

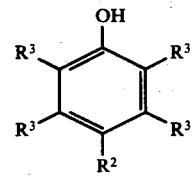

with at least one halogen-substituted carboxylic ester of the formula:

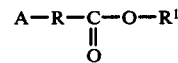

to form a compound of the formula:

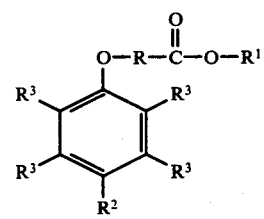

(A)

wherein R, $R^1$, $R^2$, and $R^3$ have the same significance as hereinbefore defined and A is a chlorine or bromine atom. The halogen-substituted carboxylic ester is preferably an α-chloro or α-bromo carboxylic ester and in this case R can be a methylene group (derived from an α-halo-acetic ester) or can be the group

wherein each B is a hydrogen atom or a pendant alkyl group (e.g.,

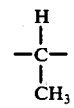

when derived from an α-halo propionic ester).

Thus, the groups R and $R^1$ in the product of the process can be determined by the selection of the appropriate halo-substituted carboxylic ester starting material. The precise nature of $R^1$ may be selected from a very wide range of groups. When derived from an ester of a halo-substituted carboxylic acid the esterifying group constituting $R^1$, i.e., the residue of a hydroxy compound, can be any of the well-known esterifying groups such as an alkyl group derived from an alkanol, e.g., methanol, ethanol, n-propanol, isopropanol, n-butanol, isobutanol, n-hexanol and the like; or a glycol monoether or polyoxyalkylene glycol monoether residue.

Alternatively, the hydroxy compound of which $R^1$ is a residue can be a di- or poly-hydroxy compound and the residue will have unused hydroxyl groups; or the hydroxy compound can be a di- or poly-hydroxy compound in which one or more, but not all, the hydroxyl groups have been replaced by groups of the formula:

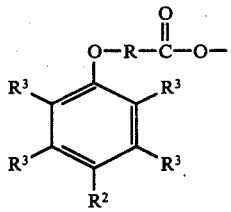

additional to that shown in the foregoing general formula (A).

Similarly, the precise nature of the groups $R^2$ and $R^3$ may be determined by the selection of the appropriate alkyl-substituted phenol starting material; and in addition in one particular case described hereinafter by the reaction conditions. Thus, when each $R^3$ is a hydrogen or halogen atom or an alkyl group this is provided by selecting the appropriately substituted phenol starting material. Similarly, compounds in which $R^3$ is a group of formula:

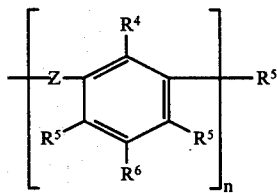

can be prepared from phenol sulfides or derivatives thereof having the appropriate substituents to provide the requisite groups $R^4$, $R^5$ and $R^6$. In this case Z will be a sulfur chain. Compounds in which Z is a methylene group likewise can be prepared from the appropriate o-methylene phenyl derivatives. A particularly useful source of o-methylene phenyl derivatives are phenol formaldehyde condensation products. Lastly, products in which Z is a residue of a carbonyl-substituted carboxylic acid or derivative thereof can be prepared by using, as starting materials, the substances which form the subject matter of our copending U.K. patent application No. 50642/72. These substances may be prepared by condensing an alkyl-substituted phenol with a carboxyl compound, e.g., of formula

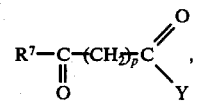

wherein $R^7$, $p$ and Y are as hereinbefore defined.

This condensation may be carried out by reacting the phenol with the carboxylic compound, for example glyoxylic, pyruvic, levulinic, 3-oxoglutaric or 2-oxoglutaric acid or esters thereof, to produce compounds in which each Y is a hydroxyl or alkoxy group. The reaction temperature may be from ambient temperature up to 150° C, with a temperature of from 60°–120° C being most useful. It is also desirable to employ an acid reaction medium, e.g., by carrying out the condensation in the presence of an acid such as sulfuric acid, p-toluene sulfonic acid or a mixture of glacial acetic and hydrochloric acids. Further details of this condensation are given in our copending application No. 50642/72 (U.S. Ser. No. 412,027).

The products of the processes of copending applications Nos. 50642/72 and 19173/73 (U.S. Ser. Nos. 412,027 and 462,092) may be utilized in the present invention as starting materials in which Z is a residue of a carbonyl-substituted carboxylic acid or derivative thereof.

In all the foregoing variations of the present invention the alkylphenol starting materials bear the appropriate substituents which, with one exception, constitute the groups $R^4$, $R^5$ and $R^6$. The exception arises when $R^4$ is a hydroxyl group. In this case the starting material will contain two or more phenolic hydroxyl groups and the halo-substituted carboxylic ester may be employed in an amount sufficient to react with a single phenolic hydroxyl group or with all such groups.

Representative examples of the preferred alkylphenol starting materials are p-$C_{50}$-polyisobutylphenol, p-$C_{60}$-polyisopropylphenol, p-$C_{200}$-polyisobutyl-o-cresol, p-$C_{100}$-polyisopropyl-o-ethylphenol, p-$C_{75}$-polyisobutyl-m-cresol, p-$C_{90}$-polyisopropyl-2,6-xylenol, p-$C_{100}$-polyisobutyl-o-tert-butylphenol, p-$C_{80}$-polyisopropyl-o-sec-butylphenol, and the like. The alkylphenols are predominantly para, although minor amounts of other isomers such as the corresponding ortho-alkylphenols which inherently form in the alkylation of phenol are also present. The most preferred alkylated phenol starting materials are the polyolefin-substituted phenols, for example, phenols substituted with polypropylene or polyisobutylene containing about 50–200 carbon atoms.

The condensation of the alkylphenol can be carried out using a halocarboxylic acid in place of the ester (Otto, U.S. Pat. No. 3,360,464). However, it has been found, according to the present invention, that in order to achieve high conversion of the high molecular weight alkylphenols to alkylphenoxy-substituted aliphatic carboxylic intermediate that it is essential that the halo-substituted carboxylic reactant be the ester rather than the acid. Use of esters in the reaction with wax-substituted phenols is mentioned in Reiff, U.S. Pat. No. 2,252,666. With the high molecular weight alkylphenol derivative, that is those in which the alkyl substituent contains over 50 carbon atoms, it is necessary to obtain high conversions of alkylphenol to ester intermediate. This is because the unreacted alkylphenol is, for all practical purposes, inseparable from the reaction mixture. When using a halocarboxylic ester the conversion of $C_{50+}$ alkylphenol to alkylphenoxy alkanoic ester is generally in excess of 60%, and most often in excess of 75%. When the similar reaction is attempted with halocarboxylic acid the conversions are much lower, generally below 50%. This greatly increased conversion using the ester reactant when applied to $C_{50+}$ alkylphenols is most surprising. Since the unreacted alkylphenol remains in the reaction product it represents an economic loss. Furthermore, the unreacted alkylphenol remains in the final product after conversion of the alkylphenoxy alkanoic compound (acid or ester) to amide. The amide is the active dispersant which is the principal utility of the intermediate compounds of the present invention. Hence, the final product obtained from the reaction product of the present invention made using a halocarboxylic ester is significantly different from the product made using a halocarboxylic acid in that it contains much less unreacted alkylphenol and much more active dispersant. This effect will be shown in the examples.

The following examples serve to illustrate the preferred alpha-halo alkanoic alkyl esters used to make the present compositions. These include methyl chloroacetate, ethyl chloroacetate, n-propyl bromoacetate, n-butyl chloroacetate, isobutyl bromoacetate, n-amyl bromoacetate, isohexyl bromoacetate, n-butyl 2-chloropropionate, isoamyl 2-bromobutyrate, and the like.

It is highly desirable to employ an acid acceptor to neutralize the hydrogen halide liberated in the condensation of the alkylphenol with the halo-substituted carboxylic ester. Such acid acceptors are well known and any suitable material can be used for this purpose, e.g., a tertiary base such as pyridine. However, the preferred acid acceptor is a metal base such as an alcoholic solution of an alkali metal hydroxide, particularly sodium or potassium hydroxide or an alkali metal or alkaline earth metal alkoxide. The latter can be readily prepared by dissolving the metal in an alcohol, such as methanol or ethanol, in well-known manner. The acid acceptor is preferably used in the stoichiometric quantity required to neutralize the hydrogen halide. When using a halo-substituted carboxylic acid, as opposed to the ester of this invention, the base will preferentially neutralize the carboxyl group of the acid and additional quantities of base will be required to first neutralize the acid. In this event, all the base required to neutralize both carboxylic acid and the hydrogen halide can be added initially to the reaction mixture. Alternatively, sufficient base to neutralize the carboxylic acid may be added initially and the remainder added dropwise during the course of the reaction at a rate sufficient to maintain the reaction mixture just alkaline. Similarly, when using an ester of the halo-substituted carboxylic acid according to the present invention the base required to neutralize the hydrogen halide may be added initially or the base may be added in portions throughout the reaction. The portionwise addition of the acid acceptor is the preferred technique.

The condensation reaction of the present invention proceeds very readily in the presence of the acid acceptor and may be carried out at ambient temperature. Conversely, comparatively high reaction temperatures can also be used up to the decomposition temperature of the reaction mixture. However, to provide a more easily controllable reaction at a rate more rapid than at ambient temperature, a compromise reaction temperature of from 60° to 150° C is preferable, a temperature of from 70° to 100° C being the optimum reaction temperature. Under these conditions the reaction is usually complete within 1 hour, completion being denoted when no further base is consumed. Dropwise addition of the acid acceptor facilitates the indication of the completion of the reaction in this way. Alternatively, a pH indicator or a pH meter may be used.

If desired, the condensation reaction of the present invention may be carried out in an inert solvent reaction medium, such as a hydrocarbon solvent or alkanol solvent. Examples of such inert solvents are benzene, toluene, xylene, n-butanol, 2-ethylhexanol and mineral oil, especially a mineral oil of lubricating viscosity.

After completion of the reaction the product may, if desired, be washed with water to remove the halide salt of the acid acceptor formed during the reaction.

The condensation products of the present invention are useful in the preparation of lubricant additives by reaction with suitable nitrogenous bases to form amides of the condensation products or subjecting them to an overbasing process.

The invention will now be illustrated with reference to the following examples.

EXAMPLE 1

This example illustrates the results obtained when a $C_{50+}$ alkylphenol is reacted with a halocarboxylic acid to prepare the alkylphenoxy alkanoic intermediate which is then reacted with an amine to form the dispersant composition. This procedure is not according to the present invention.

In a reaction vessel was placed 580 g (0.5 m) polyisobutylphenol and 300 ml petroleum ether. To this was added sodium methoxide solution prepared from 11.5 g (0.5 m) sodium and 120 ml methanol. The mixture was heated at reflux for 30 minutes and then solvents were distilled out at 200° C/40 mm for 1 hour.

To the above phenate was added 300 ml petroleum ether and a sodium methoxide solution prepared from 12.7 g (0.55 m) sodium and 120 ml methanol. While stirring at 70° C, 52 g (0.55 m) of chloroacetic acid was added. The mixture was stirred at reflux for 3 hours.

The resultant mixture was diluted with 500 ml petroleum ether and, while stirring, a solution of 100 ml conc. HCl plus 500 ml water was added. The aqueous phase was then separated, which required additional petroleum ether. The organic phase was washed three times with 90% aqueous methanol. Following this, solvents were distilled out yielding 582 g of an intermediate containing polyisobutylphenoxyacetic acid. The acidity of the mixture was 20.1 mg KOH/g. Theoretical acidity if all of the polyisobutylphenol had been converted to polyisobutylphenoxyacetic acid is 46.1 mg KOH/g. Thus, conversion of polyisobutylphenol to intermediate acid was 43.6% of theory.

To 480 g of the acid intermediate was added 19.5 g of tetraethylenepentamine (1.2 m tetraethylenepentamine per equivalent of acid) and the mixture stirred at 200° C for 5 hours. The resultant product was diluted with 87.6 g of process oil to give 544 g of an 85% concentrate analyzing 1.1 weight % nitrogen and having a total base number of 23.1 mg KOH/g.

EXAMPLE 2

In this example made according to the present invention the $C_{50+}$ alkylphenol was reacted with a halocarboxylic ester and the resultant reaction mixture reacted with an amine to form the dispersant composition.

In a reaction vessel was placed 580 g (0.5 m) of polyisobutylphenol and 300 ml petroleum ether. To this was added a solution of 11.5 (0.5 m) sodium in 120 ml methanol. The mixture was heated at reflux for 30 minutes and then solvents distilled out at 200° C/40 mm for 1 hour.

To the above phenate was added 300 ml petroleum ether and 120 ml methanol. While stirring at 70° C, 82.8 g (0.55 m) of butyl chloroacetate was added. The mixture was stirred at reflux for 3 hours. The product was washed three times with 90% aqueous methanol. Following this, the solvent was distilled out yielding 588 g of an intermediate containing butyl polyisobutylphenoxyacetate. Saponification value of the mixture was 36.5 mg KOH/g. Theoretical saponification value if all of the polyisobutylphenol had been converted to butyl polyisobutylphenoxyacetate is 44 mg KOH/g. Thus, conversion of polyisobutylphenol to intermediate ester was 83%—almost double that obtained in Example 1 using chloroacetic acid.

To 480 g of the ester intermediate was added 35.4 g of tetraethylenepentamine (1.2 m tetraethylenepentamine per equivalent of ester) and the mixture stirred at 200° C for 5 hours. The resultant product was diluted with 86.9 g of process oil to give 542 g of an 85% concentrate analyzing 2.08 weight % nitrogen and having a total base number of 51.8 mg KOH/g.

The above comparative tests show that the intermediate product made according to the present invention contained almost twice as much alkylphenoxy alkanoic compound compared to the product made in a similar manner but using a halocarboxylic acid reactant. The minor differences in the procedure of Examples 1 and 2 were necessitated by the nature of the halocarboxylic acid and ester.

As shown in Example 2, the large increase in conversion of alkylphenol to alkylphenoxy alkanoic intermediate leads upon amination to an amide dispersant containing the same high concentration of active component.

EXAMPLE 3

This example also illustrates the results obtained using a halocarboxylic acid reactant.

Preparation Of PIB Phenoxy Acetic Acid a. Preparation of sodium PIB phenate.

A p-BIB-substituted phenol (equivalent weight 1130) was prepared by alkylation of phenol, in the presence of a boron trifluoride/phenol complex, with a PIB of molecular weight 1000. To a solution of the resulting PIB phenol (79 g, 0.07 m) in petroleum ether (30 ml, b.p.=100/120° C) was added a solution of sodium methoxide in methanol, prepared from sodium metal (1.61 g, 0.07 m) and anhydrous methanol (25 ml). After stirring for 30 minutes, the product was vacuum stripped to 150° C.

b. Reaction of sodium PIB phenate with chloroacetic acid. To a solution of the sodium PIB phenate prepared in (a) (75 g, 0.065 m) in petroleum ether (50 ml, b.p.=100/120° C) was added chloroacetic acid (7 g, 0.074 m) and a solution of sodium methoxide in methanol, prepared from sodium metal (1.7g 0.074 m) and anhydrous methanol (20 ml). The mixture was heated, with stirring, under nitrogen, at 100° C for 3 hours. After allowing to cool, the product was further diluted with petroleum ether, washed with 200 ml of dilute hydrochloric acid, followed by three 200 ml portions of water, dried over anhydrous magnesium sulfate, vacuum stripped to 170° C and finally filtered. Acidity = 19 mg KOH/g.

EXAMPLE 4

This and the remaining examples illustrate the use of a hydrocarboxylic ester according to the present invention.

Preparation Of PIB Phenoxy Butyl Acetate

A PIB phenol (equivalent weight 984) was prepared in the same manner as in 1(a). To a solution of the PIB phenol (98.4 g, 0.1 m) and n-butyl chloroacetate (16.6 g, 0.11 m) in xylene (200 ml) was slowly added, over about 1 hour, a solution of sodium methoxide (5.9 g, 0.11 m) in anhydrous methanol (25 ml). The addition was carried out at 100° C and on completion the solution was heated at this temperature for a further 1 hour. The solution was washed with two 200 ml portions of dilute hydrochloric acid followed by two 200 ml portions of water, dried over anhydrous magnesium sulfate, stripped to 200° C under reduced pressure and finally filtered.

Titration of the product, against tetrabutyl ammonium hydroxide, indicated that unreacted PIB phenol equivalent to 9 mg KOH/g was present. Thus, about 82% of the PIB phenol had reacted.

EXAMPLES 5 TO 11

By the general method described in Example 4, a number of other alkyl phenoxy butyl acetates were prepared. Preparative and analytical details are given in Table I. In these preparations the sodium methoxide was prepared immediately before the preparation, using the quantities of sodium and anhydrous methanol shown in the Table. Also, after acidification, the organic solutions were washed with portions of methanol/water (4:1) until free of acid.

It can be seen from the saponification values that reaction had occurred in all these cases. In all preparations described, the evidence from saponification values was supported by infrared evidence, peaks in the 1700–1800 cm $^{-1}$ region being most indicative of formation of the required product.

EXAMPLES 12 TO 19

Polybutyl phenol (equivalent weight 1143), derived from 1000 m.w. PIB, was also reacted with a number of other haloesters, again using the general method described in Example 4. The preparative and analytical details are given in Table II. In the first two examples in Table II, preformed sodium methoxide was used, but in all other cases, the methoxide was prepared immediately beforehand, using the quantity of sodium shown.

TABLE I

REACTION OF PHENOLS WITH n-BUTYL CHLOROACETATE

| Ex. No. | PHENOL | n-Butyl Chloroacetate | | Sodium | |
|---|---|---|---|---|---|
| | | g | moles | g | g atoms |
| 5 | Dodecyl | 52.4 | 0.2 | 33.1 | 0.22 | 5.1 | 0.22 |
| 6 | Poly-A propyl | 125.8 | 0.05 | 8.4 | 0.005 | 1.27 | 0.055 |
| 7 | Poly-B isobutyl | 65.1 | 0.1 | 16.6 | 0.11 | 2.5 | 0.11 |
| 8 | Poly-C isobutyl | 123 | 0.05 | 8.3 | 0.055 | 1.27 | 0.055 |
| 9 | Poly-D isobutyl-o-methyl | 56.2 | 0.03 | 4.96 | 0.033 | 0.76 | 0.033 |
| 10 | Nonyl-E phenyl sulfide | 194 | 0.2 | 66.3 | 0.44 | 10.5 | 0.44 |
| 11 | 2-chloro 4-dodecyl | 296.5 | 1.0 | 165.6 | 1.1 | 25 | 1.1 |

| Ex. No. | Methanol | Other Solvent | Yield | Saponification Value |
|---|---|---|---|---|
| | (c.c.) | | g (%) | (mg KOH/g) |
| 5 | 70 | Xylene (50cc) | 53.1 (78) | 128 |
| 6 | 18 | " | 113.0 | 18.3 (86) |
| 7 | 35 | Pet. Ether B.P. 100/120 | 64.0 (84) | 65.2 |

TABLE I-continued
REACTION OF PHENOLS WITH n-BUTYL CHLOROACETATE

| | | | | |
|---|---|---|---|---|
| 8 | 35 | Xylene (30cc) (40cc) | 85.4 (66) | 8.7 |
| 9 | 20 | Toluene (30cc) | 57.5 (97) | 22.2 |
| 10 | 100 | Toluene (100cc) | 202 (84) | 114 (%S:9.0) |
| 11 | 250 | Toluene (150cc) | 340.3 (83) | 141 (%Cl:9.7) |

Footnotes
A = from Polyproptlene M.W. 860
B = from Polyisobutylene M.W. 400
C = from Polyisobutylene M.W. 2000
D = from Polyisobutylene M.W. 1000 and o-cresol, via $BF_3$ catalysis
E = Nonylphenyl/Sulfur ratio = 4:3

TABLE II
REACTION OF POLYISOBUTYL PHENOL (EX 1000 M.W. POLYISOBUTYLENE) WITH OTHER HALO ESTERS

| Ex. No. | ESTER | PIB Phenol g | moles | g | moles | Sodium g | g atoms moles |
|---|---|---|---|---|---|---|---|
| 12 | Ethyl chloroacetate | 12.9 | 0.105 | 67.3 | 0.07 | 5.7 (NaOMe) | 0.105 |
| 13 | n-Hexyl chloroacetate | 18.8 | 0.105 | 67.3 | 0.07 | 5.7 (NaOMe) | 0.105 |
| 14 | Ethyl bromoacetate | 18.4 | 0.11 | 114.3 | 0.1 | 2.5 | 0.11 |
| 15 | Ethyl 2-bromobutyrate | 21.5 | 0.11 | 114.3 | 0.1 | 2.5 | 0.11 |
| 16 | n-Butyl chloroacetate | 281.4 | 1.87 | 194.3 | 1.7 | 43.0 | 1.87 |
| 17 | n-Butyl dichloroacetate | 20.4 | 0.11 | 228.6 | 0.2 | 2.5 | 0.11 |
| 18 | Methoxy-A ethoxyethyl chloroacetate | 43.3 | 0.22 | 228.6 | 0.2 | 5.0 | 0.22 |
| 19 | Ethyl 3-bromopropionate | 19.9 | 0.11 | 114.3 | 0.1 | 2.5 | 0.11 |

| Ex. No. | Methanol (c.c) | Other Solvent | Yield g (%) | Saponification Value (mg KOH/g) |
|---|---|---|---|---|
| 12 | 28 | Xylene (70cc) | — | 39.5 |
| 13 | 28 | Xylene (70cc) | 63 (81) | 36.3 |
| 14 | 35 | Xylene (90cc) | 104 (85) | 31.6 |
| 15 | 35 | Toluene (50cc) | 118 (94) | 37.1 |
| 16 | 600 | Xylene (850cc) | 1734 (79) | 40 |
| 17 | 35 | Xylene (100cc) | 204 (85) | 9.0 |
| 18 | 50 | Toluene (100 cc) | 230 (88) | 39.4 |
| 19 | 35 | Toluene (50cc) | 110 (89) | 16 |

Note A: from monomethylether of diethylene glycol

EXAMPLE 20

Preparation of 11-(Dodecyl Phenoxy) n-Butyl Undecanoate

A solution of sodium methoxide, prepared from sodium (2.5 g, 0.11 g atom) and anhydrous methanol (35 c.c.) was added dropwise, during ½ hour, to a stirred solution of dodecyl phenol (26.2 g, 0.1 mole) and n-butyl-11-bromoundecanoate (35.5 g, 0.11 mole) in toluene (50 c.c.) at 70° C. Reaction was continued for 2 hours and the solution was washed with dilute hydrochloric acid and with aqueous methanol (9:1). After the solution was dried over magnesium sulfate, the solvent was removed, leaving an oil (45 g, 88%). Saponification value, 139 mg KOH/g.

EXAMPLE 21

Preparation Of Nonyl Phenoxy Ethyl Acetate

Sodium (8.6 g, 0.37 g atom) was reacted with anhydrous methanol (100 c.c) to give a solution of sodium methoxide. This solution was then added, during ½ hour, to a stirred solution of nonyl phenol (66 g, 0.375 mole) and ethyl chloroacetate (46 g, 0.375 mole) in n-butanol (250 c.c.) at 85° C. Reaction at 85° C was continued for 1 hour, and the solution was allowed to cool. Sodium chloride was filtered off and the n-butanol was distilled out. The residue was dissolved in hexane (1500 c.c.), the solution was washed with dilute ammonium chloride solution and with water (3 × 500 c.c.). The solution was dried over sodium sulfate, and the hexane was distilled out leaving a brown liquid (87 g, 95%). Saponification value—159 mg KOH/g.

EXAMPLE 22

Preparation Of Pentaerythritol Ester Of PIB Phenoxyacetic Acid

A mixture of the product of Example 3 (37.3 g) and pentaerythritol (5.5 g, 100% excess) was stirred and heated at 200° C for 4 hours, under a blanket of nitrogen. Filtration gave the required ester. The acidity had dropped to 1 mg KOH/g and the saponification value was 53 mg KOH/g.

EXAMPLE 23

Preparation Of Trimethylol Propane Ester Of PIB Phenoxyacetic Acid

A second sample of PIB phenoxyacetic acid was prepared by the method of Example 3 but using toluene as solvent and a reaction time of 15 hours. The acidity was 23.8 mg KOH/g.

This product (47.2 g) was heated and stirred with 3.48 g (100% excess) of trimethylol propane oxetane (3-ethyl-3-hydroxymethyl oxetane) for 3½ hours at 200°. The product was dissolved in petroleum spirit (b.pt. 62°–68° C), the solution was washed with methanol/water (9:1; 2 × 25 cc) and dried over magnesium sulfate. Removal of the solvent and filtration gave the required ester (36.2 g, 73%).

| Acidity: | 0.02 mg KOH/g |
|---|---|
| Saponification value: | 29.4 mg KOH/g |
| Hydroxyl value: | 48.8 mg KOH/g |

We claim:
1. A process for making a high molecular weight alkylphenoxy-substituted aliphatic carboxylic ester from an alkylphenol containing 50–200 carbon atoms in the alkyl group, said process being conducted without separating $C_{50-200}$ alkylphenol from the resultant product, said process comprising reacting at least one alkyl-substituted phenol in which the alkyl substituent contains from 50 to 200 carbon atoms with at least one halogen-substituted aliphatic carboxylic ester to obtain said alkylphenoxy-substituted aliphatic carboxylic ester in high yield.

2. A process of claim 1 wherein said alkyl-substituted phenol is a poly-alpha-olefin-substituted phenol.

3. A process of claim 2 wherein said alkyl-substituted phenol is a para-alkyl-substituted phenol.

4. A process of claim 2 wherein said halogen-substituted aliphatic carboxylic ester is selected from the group consisting of α-chloro- and α-bromo-substituted aliphatic carboxylic esters.

5. A process of claim 4 wherein said ester is an alkyl ester in which said alkyl contains from 1 to about 6 carbon atoms.

6. A process of claim 5 wherein said ester is n-butyl α-chloroacetate.

7. A process of claim 5 wherein said poly-alpha-olefin-substituted phenol is a polyisobutylphenol.

8. A process of claim 7 wherein said aliphatic carboxylic ester is an α-chloroacetic ester.

9. A product made by the process comprising reacting at least one alkyl-substituted phenol in which the alkyl substituent contains from 50 to 200 carbon atoms with at least one halogen-substituted aliphatic carboxylic ester to obtain a reaction product containing a major amount of $C_{50-200}$ alkylphenoxy aliphatic carboxylic ester and a minor amount of $C_{50-200}$ alkylphenol, said process being conducted without removing said minor amount of said $C_{50-200}$ alkylphenol from said product.

10. A product of claim 9 in which said alkyl-substituted phenol is a poly-alpha-olefin-substituted phenol.

11. A product of claim 10 wherein said halogen-substituted aliphatic carboxylic ester is selected from the group consisting of α-chloro- and α-bromo-substituted aliphatic carboxylic esters.

12. A product of claim 11 wherein said ester is an alkyl ester in which the alkyl contains from 1 to about 6 carbon atoms.

13. A product of claim 12 wherein said ester is n-butyl α-chloroacetate.

14. A product of claim 12 wherein said poly-alpha-olefin-substituted phenol is a polyisobutylphenol.

15. A product of claim 14 wherein said aliphatic carboxylic ester is an α-chloroacetic ester.

* * * * *

UNITED STATES PATENT AND TRADEMARK OFFICE
CERTIFICATE OF CORRECTION

PATENT NO. : 4,046,802

DATED : September 6, 1977

INVENTOR(S) : John Scotchford Elliott et al

It is certified that error appears in the above-identified patent and that said Letters Patent are hereby corrected as shown below:

Column 10, Table I, Ex. No. 6, under the heading "n-Butyl Chloroacetate," subheading "moles," (second occurrence) - the figure "0.005" should be -- 0.055 --

Column 10, Table I, (second part), Ex. No. 6, the figure "(86)" should be deleted from its position under the heading "Saponification Value," subheading "(mg KOH/g)" and repositioned under the heading -- Yield -- subheading -- g (%) --

Signed and Sealed this

Twenty-second Day of November 1977

[SEAL]

Attest:

RUTH C. MASON
Attesting Officer

LUTRELLE F. PARKER
Acting Commissioner of Patents and Trademarks